April 21, 1925.
H. G. SHORTT
1,534,090
DEVICE FOR TRAPPING AND DELIVERING CONDENSATES
Filed April 9, 1921
8 Sheets-Sheet 2
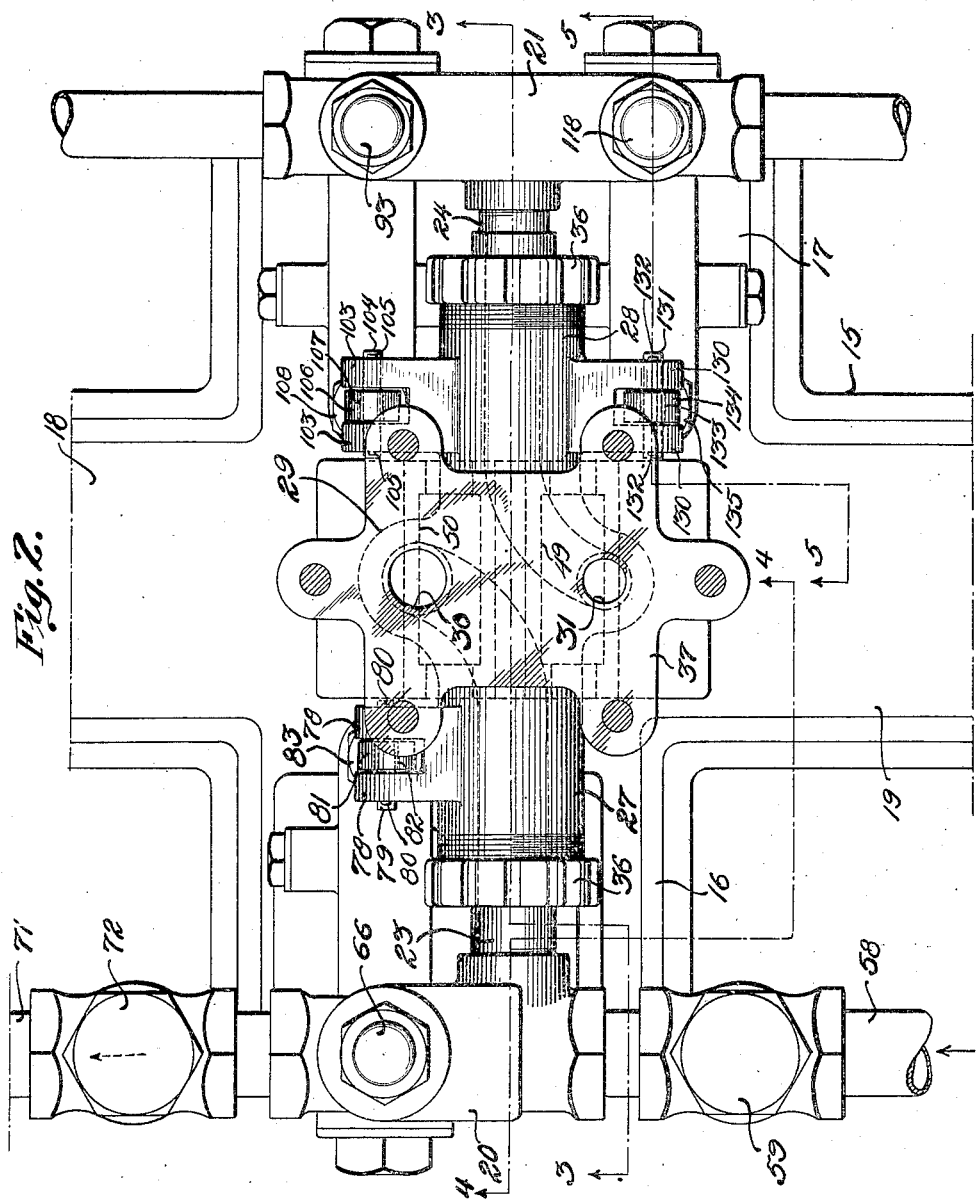
Inventor
Howard G. Shortt
By
his Attorney April 21, 1925.
H. G. SHORTT
1,534,090
DEVICE FOR TRAPPING AND DELIVERING CONDENSATES
Filed April 9, 1921     8 Sheets-Sheet 3
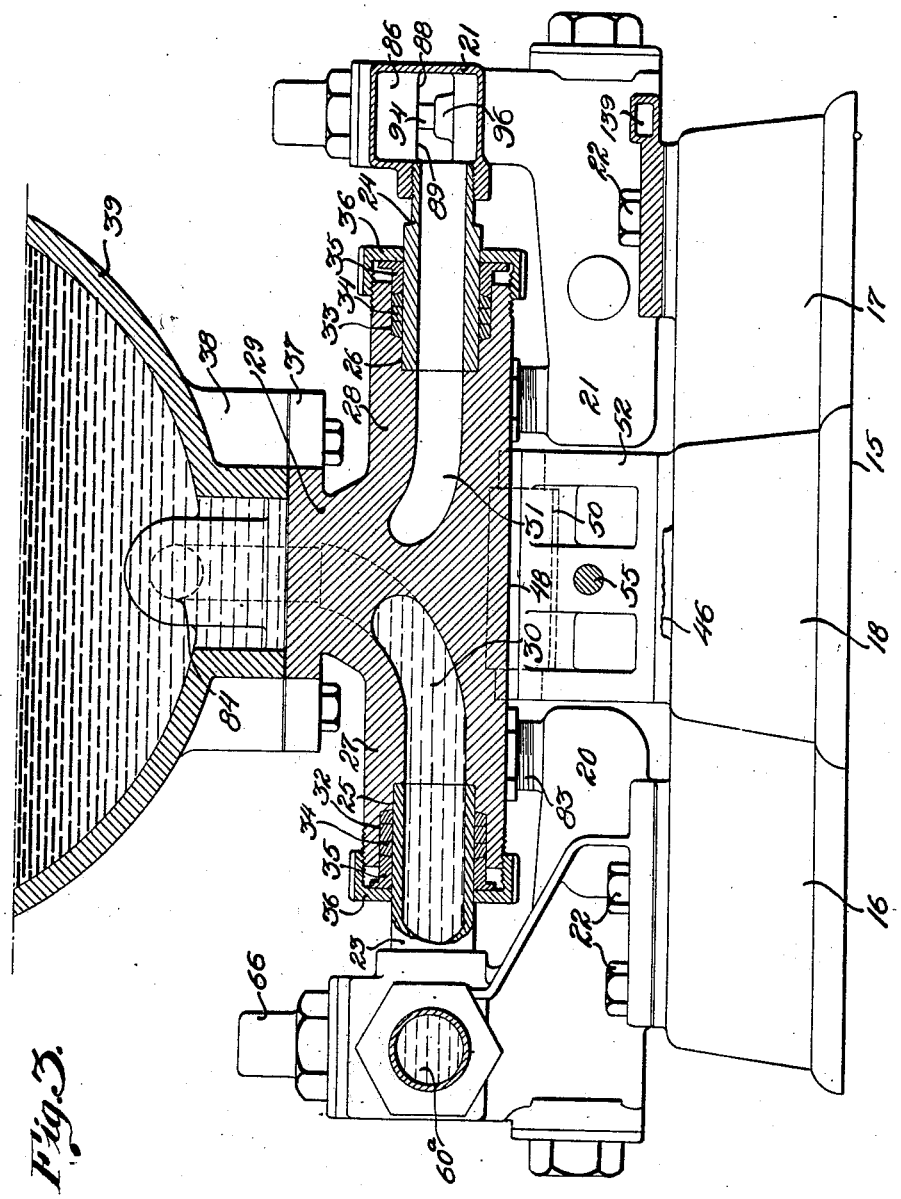
Inventor
Howard G. Shortt
By
his Attorney

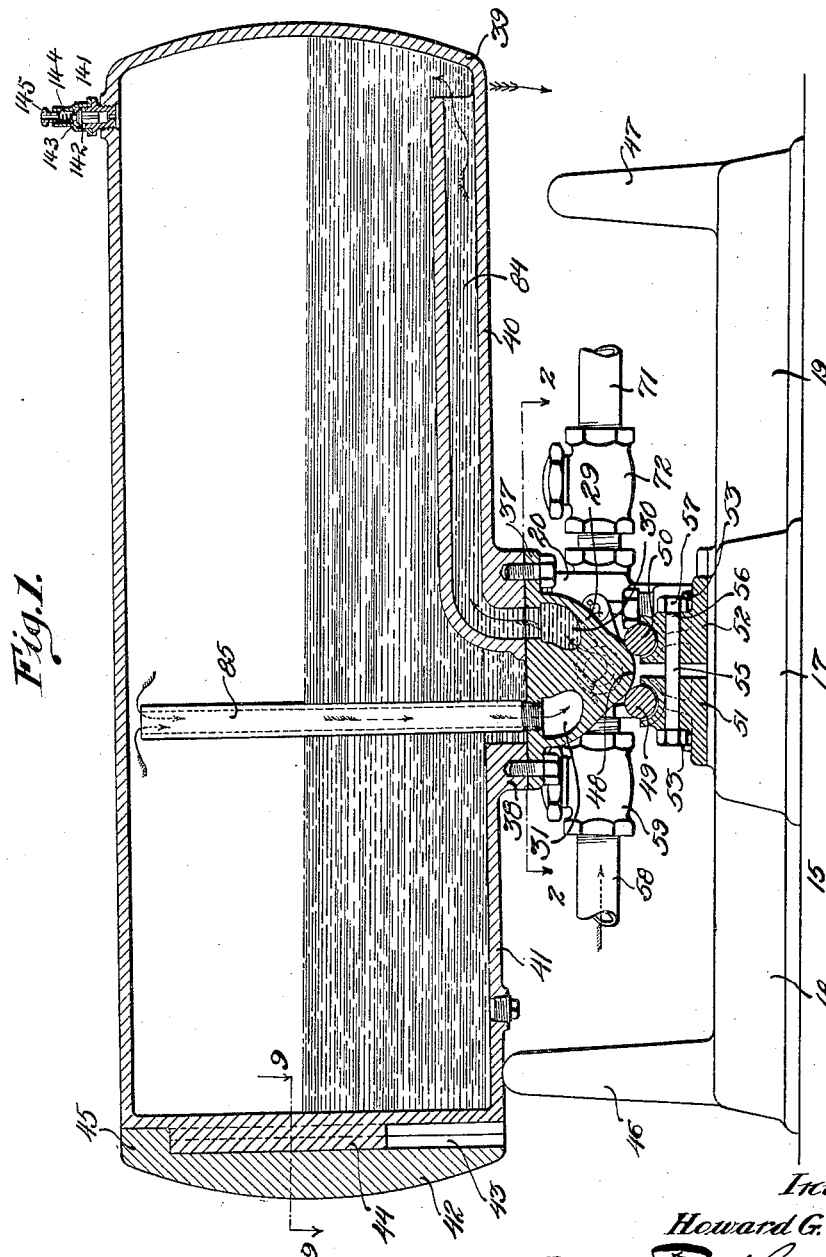

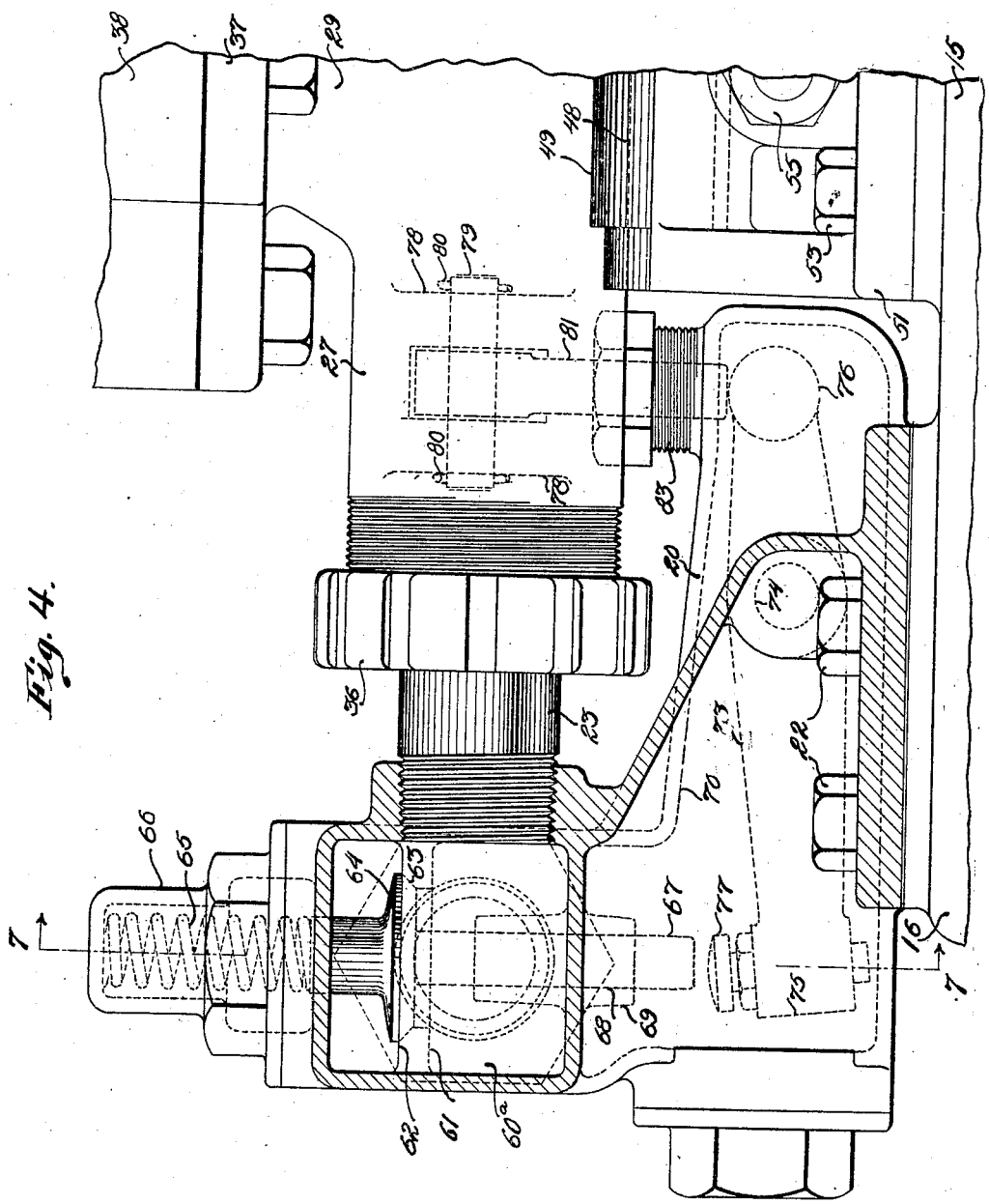

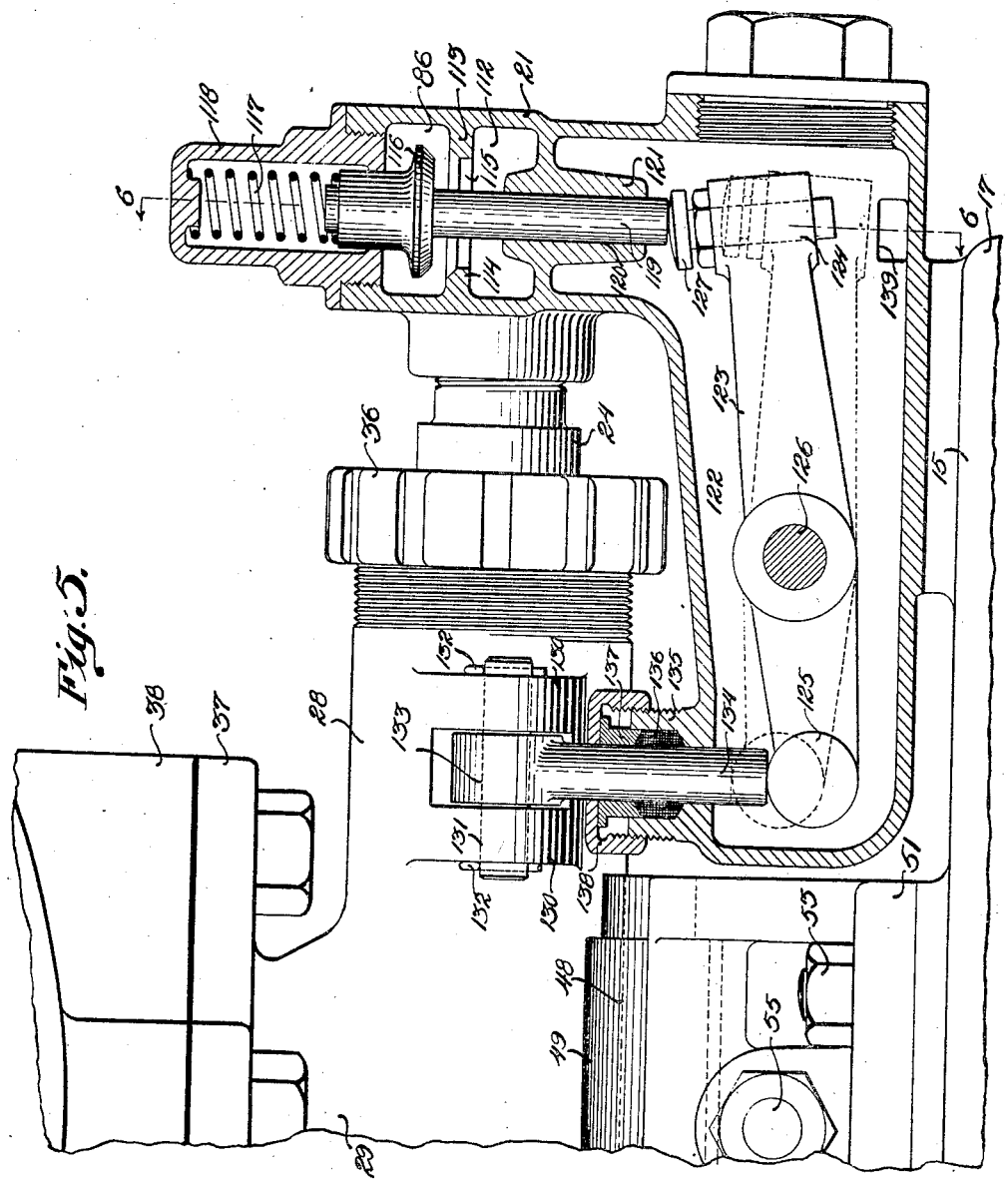

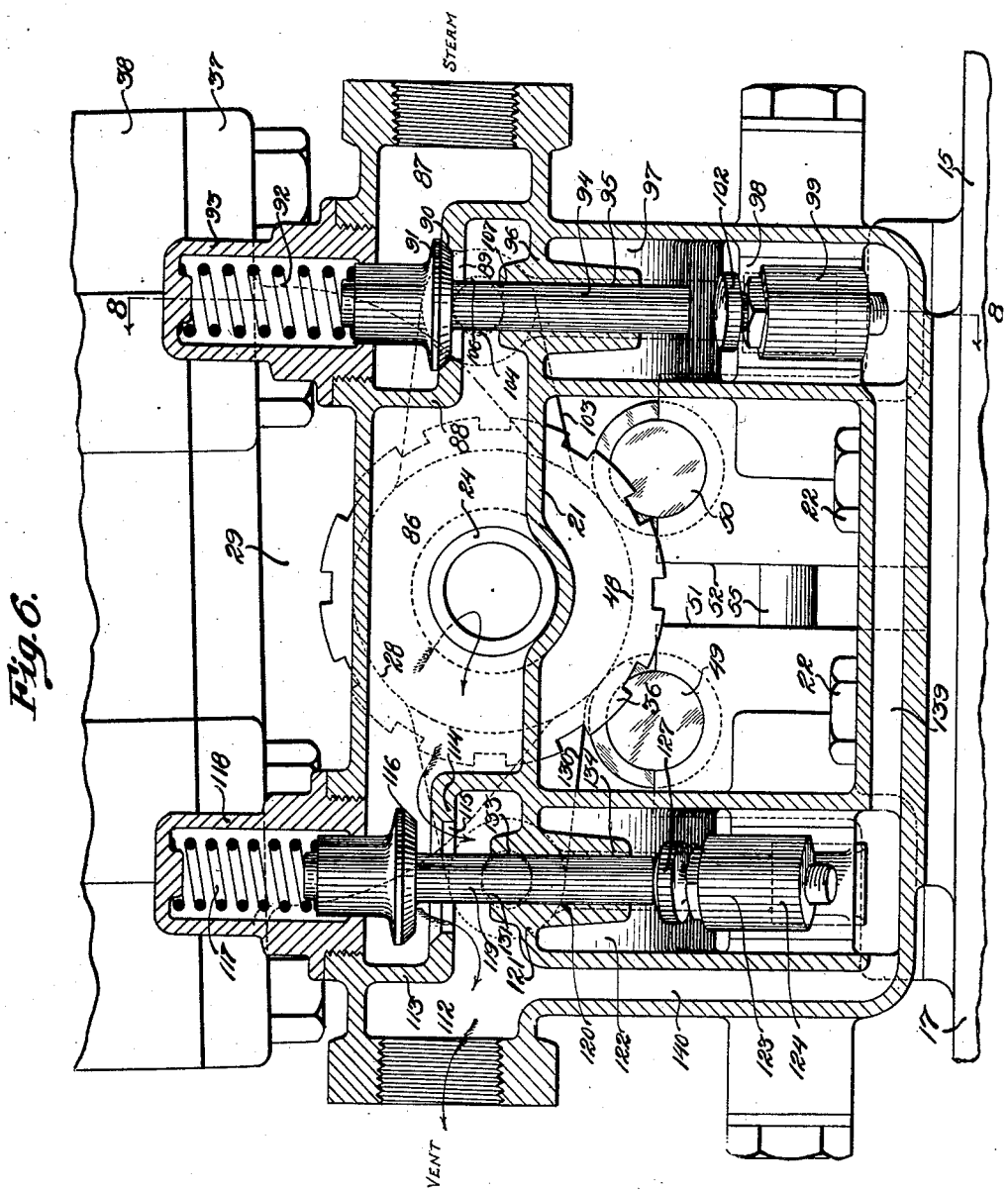

April 21, 1925.
H. G. SHORTT
1,534,090
DEVICE FOR TRAPPING AND DELIVERING CONDENSATES
Filed April 9, 1921
8 Sheets-Sheet 7
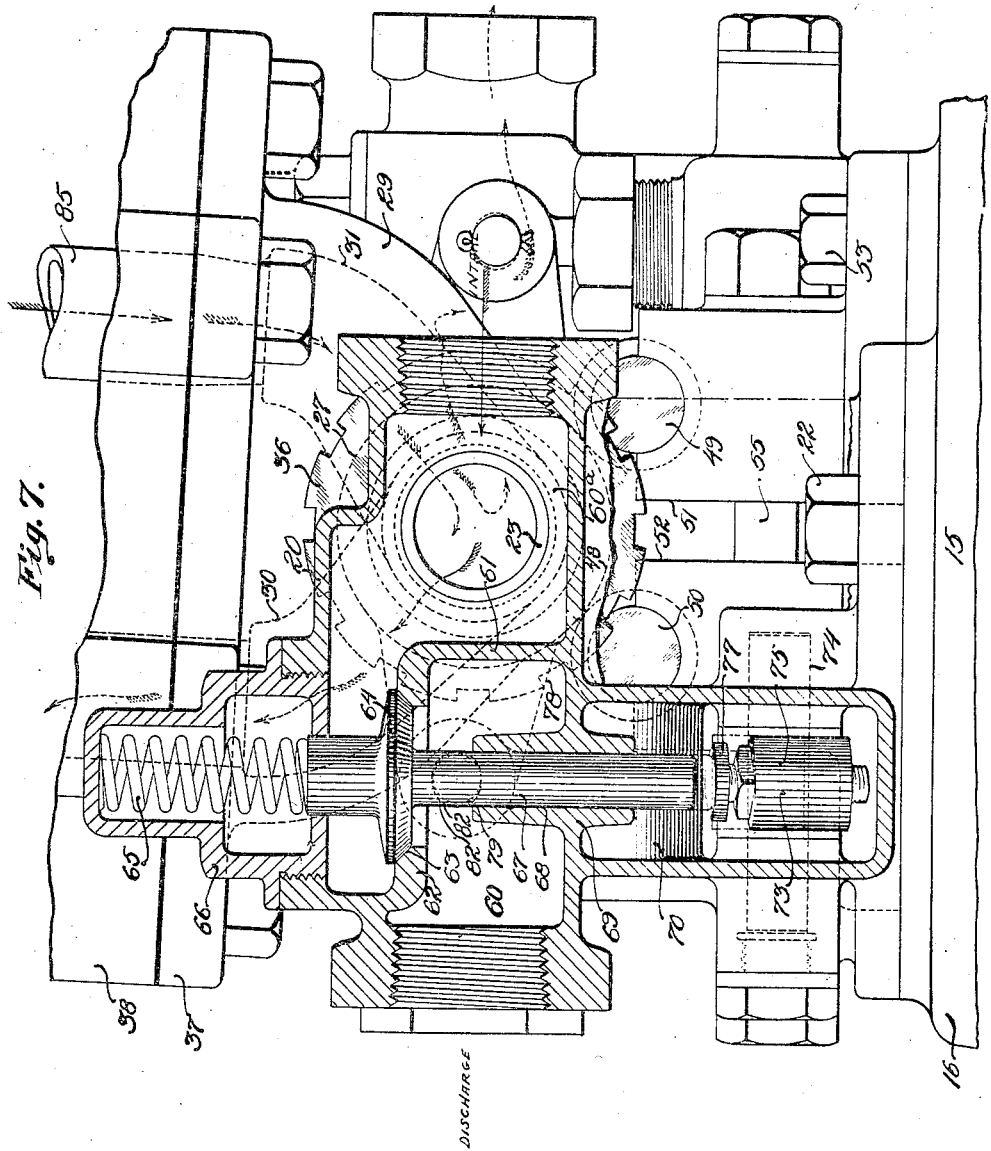

April 21, 1925.
H. G. SHORTT
1,534,090
DEVICE FOR TRAPPING AND DELIVERING CONDENSATES
Filed April 9, 1921
8 Sheets-Sheet 8
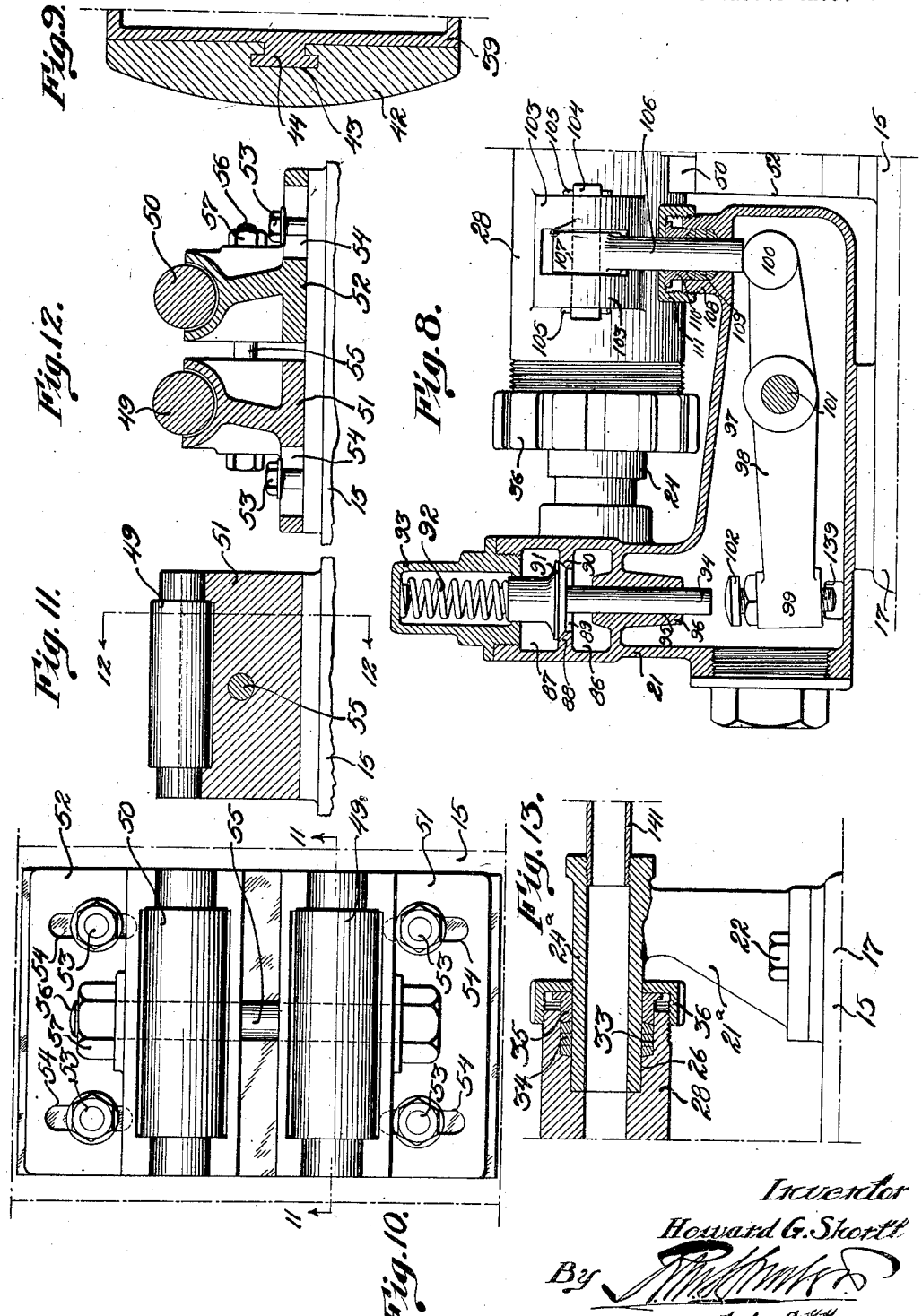

Patented Apr. 21, 1925.

1,534,090

UNITED STATES PATENT OFFICE.

HOWARD G. SHORTT, OF NORRISTOWN, PENNSYLVANIA, ASSIGNOR TO FREDERICK C. FARNSWORTH, OF NORRISTOWN, PENNSYLVANIA.

DEVICE FOR TRAPPING AND DELIVERING CONDENSATES.

Application filed April 9, 1921. Serial No. 460,124.

*To all whom it may concern:*

Be it known that I, HOWARD G. SHORTT, a citizen of the United States, and resident of Norristown, county of Montgomery, and State of Pennsylvania, have invented an Improvement in Devices for Trapping and Delivering Condensates, of which the following is a specification.

A number of forms of devices have been made for trapping and delivering high temperature condensate in which trap tanks were used for receiving the condensate; said tanks being pivotally mounted so as to tilt automatically, when the volume of liquid therein reached a predetermined amount, to effect the delivery of said condensate. Since the pivotal bearings or swinging joints for said tanks were usually spaced apart and served as fluid conduits into and out of the tank, great friction was imposed upon them due to the weight of the tanks. This friction had to be overcome by the overbalancing liquid in the tanks and consequently the tanks did not respond quickly in their tilting action and an excessive overbalancing was required. Since the action of the discharge valves and intake valves was effected by the tilting action of the tank, it is obvious that the opening and closing of these valves were delayed proportionately to the time it took to cause the tanks to tilt from one position to another, and therefore the machines were slow in operation.

One object of my invention is to reduce the friction at the pivotal bearings or swinging joints of a device of this character so that the tank will be immediately responsive in its tilting action when the liquid within the tank reaches a predetermined volume and whereby the tank will quickly and freely overbalance and effect a complete and proper discharge of the condensate.

Another object is to so construct my invention that, while the above object is being attained, the spaced swinging joints or bearings are allowed to serve as the fluid conduits into and out of the tank and be properly packed while in operation.

Another object is to so construct and arrange the valves and their co-acting parts as to insure against fluid leakage without possibility of the valves accidentally sticking and failing to operate.

A further object is to make the device of my invention of a practical and durable construction and so that it can be easily manufactured, adjusted, and controlled.

With the above and other objects in view, the nature of which will be more fully understood from the description hereinafter, the invention consists in the novel construction of devices for trapping and delivering condensates, as hereinafter more fully described and defined in the claims.

Referring to the drawings: Fig. 1 is a longitudinal central vertical section of a device made in accordance with my present invention; Fig. 2 is an enlarged sectional plan view taken on the line 2—2 of Fig. 1 and looking in the direction of the length of the device; Fig. 3 is a fragmentary sectional elevation taken on the line 3—3 of Fig. 2; Fig. 4 is an enlarged fragmentary elevation taken on the line 4—4 of Fig. 2; Fig. 5 is an enlarged fragmentary elevation taken on the line 5—5 of Fig. 2; Fig. 6 is a sectional elevation taken on the line 6—6 of Fig. 5; Fig. 7 is a sectional elevation taken on the line 7—7 of Fig. 4; the liquid check valves and piping being omitted; Fig. 8 is a section taken on the line 8—8 of Fig. 6 and drawn on a smaller scale than Fig. 6; Fig. 9 is a fragmentary section taken on the line 9—9 of Fig. 1; Fig. 10 is a top plan view of the adjustable friction eliminating means which forms a part of my present invention; Fig. 11 is a section taken on the line 11—11 of Fig. 10, friction reducing means being shown in elevation; Fig. 12 is a section taken on the line 12—12 of Fig. 11; and Fig. 13 is a fragmentary section showing a substitute construction for the steam and vent valve mechanisms and which can be used when the device is employed merely as a separator of the condensate in a steam line or the like.

Referring to the drawings and particularly to Figs. 1 to 12, inclusive, my improved device includes a base plate 15 desirably having two lateral extensions 16 and 17 and two longitudinal extensions 18 and 19. The lateral extensions 16 and 17 respectively support two hollow pedestal casings 20 and 21 which, in the present instance, are secured to the base by means of bolts 22. The pedestal casings 20 and 21 have tubular projections or nipples 23 and 24 respectively communicating with the interior thereof; said nipples extending toward each other in axial alinement and being spaced apart, as clearly shown in Fig. 3. These nipples 23 and 24 fit within bores 25 and 26 respectively of two laterally extending arms 27 and 28 of a manifold 29; said manifold being preferably made of a casting of which the arms 27 and 28 are integral parts. The arrangement is such that the interiors of the nipples 23 and 24 communicate with passages 30 and 31 in the manifold 29. The arms 27 and 28 have counter-bores 32 and 33 in which is placed packing 34; said packing surrounding the nipples 23 and 24 and being held in place by glands 35. The outer ends of the arms 27 and 28 are screw threaded and cap nuts 36 are respectively screwed thereon and serve to engage the glands 35 so as to hold the packing in sealing engagement with the peripheral surfaces of the nipples 23 and 24. These devices constitute swing joint bearings. The top of the manifold 29 has a flange 37 which is bolted to a boss 38 located at the bottom of a trap tank 39. This trap tank is preferably made cylindrical in form and elongated as shown in Fig. 1, so that a vertical central longitudinal plane including the axis of the cylindrical portion of the tank will pass, preferably, between the opposed ends of the nipples 23 and 24. The portion 40 of the tank 39, forward of a vertical plane passing through the axes of the nipples 23 and 24, is preferably of greater length than the portion 41 of said tank to the rear of said latter plane. However, in the form shown, the portion 41 of said tank is made heavier than the portion 40 by the application of a weight 42, as shown in Figs. 1 and 9. This weight 42 has an undercut slot 43 adapted to be engaged by a rib 44 which is T shape in cross section as shown in Fig. 9; the weight having a part 45 adapted to abut the top of the rib 44 so as to hold the weight in place. However, to remove the weight, it is merely necessary to lift the same until the grooves 43 are clear of the rib. Thus, with the mounting so far described, the tank 39 will tilt rearwardly and this rearward tilting action is arrested by a projection or stop 46 on the longitudinal extension 18 of the base 15. The extension 19 of said base also has a stop 47 so that when the tank tilts forwardly, as will hereinafter be described, the portion 40 will abut the stop 47 and thereby limit the forward tilting action.

The manifold 29 has a lower surface portion 48 of a curvature concentric with the common axis of the bores 25 and 26 in the arms 27 and 28. This surface 48 between longitudinal vertical planes extending between the opposed ends of the nipples 23 and 24 is adapted to be engaged by rollers 49 and 50 which have bearings in saddles or shoes 51 and 52 respectively; said saddles being spaced apart and adapted to be secured to the middle of the base 15 by means of bolts 53 which extend through longitudinally extending slots 54 in the bottom portions of said saddles, as clearly shown in Figs. 10, 11 and 12. The rollers 49 and 50 are preferably arranged with their top surfaces at the same level and above the tops of the saddles and so that the surface 48 of the manifold has its lowermost portion extending between the rollers and below the uppermost parts of their surfaces as clearly shown in Fig. 1. It is thus obvious that if the rollers 49 and 50 are moved toward each other that they will raise the manifold 29; the lifting action taking place between the nipples 23 and 24.

In constructing my invention, I provide means for accomplishing this movement; said means consisting of a bolt 55 which is screw threaded at its end 56 and provided with a nut 57. Thus the saddles, rollers and bolt 55 provide an adjustable anti-friction jack for lifting engagement with the central portion of the manifold and provide means for keeping the bores of the arms in axial alinement with the nipples 23 and 24 and if any springing action should occur, due to the weight of the tank, or if there is any wear at the coupling between the nipples and the arms, the same can be compensated for merely by turning the nut 57 on the bolt 55 to cause the rollers 49 and 50 to move toward each other or away from each other as necessity requires. With this means even though the trap tank is exceptionally heavy, as it is in large devices, the friction at the swinging joints, or in other words, between the nipples and the arms of the manifold, can be greatly reduced.

Considering my device as applicable for use, for example, in high pressure steam lines with the object of serving as a trap for condensate, such for example, as the water condensate of steam, the hollow pedestal casing 20 serves as an inlet for the water of condensation through a pipe 58 which includes a check valve 59; said pipe entering a chamber 60ª in the hollow pedestal as shown in Fig. 7; said chamber communicating with the nipple 23. This chamber 60ª is normally separated from a discharge chamber 60 by means of a partition 61; the upper horizontal part 62 of which having a port providing a valve seat 63 against which a valve 64 is adapted to be held by a spring 65 arranged in a removable screw threaded cap 66. The valve 64 is vertically operative and has a stem 67 which slidably fits within a hole 68 in a partition 69 which separates the chamber 60 from a sub-chamber 70; the lower end of the valve stem 67 extending into the sub-chamber 70, as clearly shown in Figs. 4 and 7. The water discharge chamber 60 may have a pipe 71 communicating therewith for the purpose of delivering the discharge water for any purpose desired; said pipe 71 preferably having a check valve 72 therein.

The sub-chamber 70 has a lever 73 therein; said lever being pivoted at 74 between its ends 75 and 76. The end 75 of this lever 73 has an adjustable pin 77 thereon adapted for engagement with the lower end of the valve stem 67. The arm 27 of the manifold has two bosses 78 which are spaced apart and through which extends a pivot pin 79; said pivot pin being held in place by cotter pins 80. An actuating rod 81 has its upper end positioned between the bosses 78 and has a slot 82 through which the pin 79 extends. The lower portion of the actuating rod 81 extends into the sub-chamber 70 through a stuffing box 83; said stuffing box projecting upwardly from the hollow pedestal 20. The lower end of the actuating rod 81 is adapted to bear on the upper surface of the end 76 of the lever 73.

The top of the passage 30 in the manifold 29 communicates with the interior of the tank 39 through the medium of a passage 84 which follows the bottom of the tank and is open at its forward end, as clearly shown in Fig. 1. The tank shown is of cast metal, though this is not essential, as it may be made in any suitable manner.

A pipe 85 leads upwardly from the top of the passage 31 of the manifold 29 into the tank 39 and is open adjacent the upper portion of the chamber therein; and when the parts are in the position shown in Figs. 1 and 7, the valve 64 will be closed and water of condensation entering through the pipe 58 will pass into the chamber 60ª of the hollow pedestal casing 20, thence through the nipple 23 into the passage 30, and through the passage 84 into the tank 39.

The hollow pedestal casing 21 has a chamber 86 which is common to the steam and vent parts of the device, as clearly shown in Fig. 6. The main chamber of this casing communicates with the nipple 24 and is separated from the steam inlet chamber 87 by a partition 88 in which there is a port 89 providing a seat 90 for a valve 91; said valve normally being held against its seat by a spring 92 in a cap 93 which is in screw threaded connection with the top of the pedestal casing 21 at one side of the nipple 24.

High pressure steam may be admitted into the chamber 87 by any suitable pipe connection, as clearly obvious from Fig. 6. The valve 91 has a stem 94 vertically slidable in a hole 95 in a partition 96 which separates the chamber 86 from a sub-chamber 97. The chamber 97, as clearly shown in Fig. 8, has a lever 98 which is pivoted between its ends 99 and 100 on a pivot pin 101. The end 99 has an adjustable pin 102 adapted to engage under the lower end of the valve stem 94 which projects into the sub-chamber 97.

The arm 28 of the manifold 29 has two bosses 103 projecting laterally from one side through which a pivot pin 104 extends; said pivot pin being held in place by cotter pins 105. An actuating rod 106 has a slot 107 through which the pivot pin 104 extends, said slotted portion of the actuating rod being positioned between the bosses 103. The lower end of the actuating rod 106 slidably extends into the sub-chamber 97 of the hollow pedestal 21 and engages the top of the end 100 of the lever 98. The entrance opening for the actuating rod 106 into the sub-chamber 97 is provided with a stuffing box 108 which includes packing 109, a gland 110 and a screw threaded cap 111 for holding the gland in engagement with the packing so as to form a seal to prevent steam which may possibly leak into the sub-chamber 97 therefrom at the position where the actuating rod enters. The hollow pedestal casing 21 at the opposite side of the nipple 24 provides a vent chamber 112 which is separated from the chamber 86 by means of a partition 113; said partition 113 having a horizontal portion 114 providing a port 115; the latter forming a seat for a valve 116. This valve is adapted to be moved toward and held against its seat by means of a spring 117 in a cap 118 secured to the top of the pedestal casing, as shown in Fig. 6. The valve 116 has a stem 119 which slidably fits within a hole 120 in a partition 121 which separates the vent chamber 112 from another sub-chamber 122. A lever 123 is pivotally mounted between its ends 124 and 125 on a pin 126 within the sub-chamber 122. The end 124 of the lever 123 has an adjustable pin 127 adapted to engage under the lower end of the stem 119 of the valve 116. The side of the arm 28 opposite the bosses 103 has other bosses 130 through which pass a pivot pin 131 which is held in place by cotter pins 132; as clearly shown in Fig. 5. This pin 131 extends through a slot 133 in the top of an actuating rod 134. The actuating rod 134 depends through a stuffing box 135 which includes packing 136, a gland 137 and a cap nut 138; said cap nut being operative to move and hold the packing in engagement with the lower end of the actuating rod so as to permit the latter to slidably extend into the sub-chamber 122 and engage the top of the end 125 of the lever 123. The hollow pedestal 21 has a passage 139 as shown in Fig. 6 which communicates with the bottoms of the sub-chambers 97 and 122; said passage 139 having a branch 140 which leads upwardly to the vent chamber 112.

Considering that the device is to be used for trapping and delivering water of condensation and is in connection with a high pressure steam line and that the tank 39 is in its normal position with the portion 41 resting on the projection 46 of the base, it will be noted that the actuating rod 134 will be in a position, as shown in Fig. 5, holding the end 125 of the lever 123 down so that the pin 127 engages and holds the vent valve 116 off its seat so that the interior of the tank 39 will be in communication with the vent chamber 112 through the medium of the pipe 85, manifold passage 31, nipple 24 and chamber 86. It will also be noted that the actuating rod 106 will be in its raised position and that the spring 92 and steam will hold the steam valve 91 on its seat; the water valve 64 also being in the closed position as previously stated. The water of condensation will pass through the pipe 58, then into the chamber 60$^a$, through the nipple 23, manifold passage 30 and tank passage 84 into the tank; the vent being provided by the pipe 85, passage 31, nipple 24, chamber 86, port 115 and the chamber 112.

When the water within the tank 39 reaches a volume capable of effecting the tilting of the tank, the tank 39 will tilt axially on the swing joints and upon the roller bearings 49 and 50 as pivots, until the portion 40 of the tank engages the stop 47. This tilting action results in the swinging of the lever 98 by the actuating rod 106 to open the steam valve 91, at the same time the actuating rod 134 moves upwardly and allows the spring 117 to close the vent valve 116. Also the actuating rod 81 will move down and swing the lever 73 into a position to open the water valve 64. The high pressure steam will then enter the top of the tank 39 through the medium of the chamber 87, port 89, chamber 86, nipple 24, manifold passage 31 and pipe 85. The water of condensation, due to the pressure of the steam thus admitted, will be quickly forced out of the tank through the passages 84 and 30, nipple 23, chamber 60$^a$ and chamber 60 from where it will be conducted through the discharge pipe 71. When the condensate has been discharged from the tank the latter will again tilt into its normal trapping position with the portion 41 against the stop 46; thus effecting the closing of the steam valve and water discharge valve and the opening of the vent valve to again allow another load of condensate to enter the tank.

It will be noted that by the construction above described and as illustrated in the drawings, it is not necessary to pack the steam valve, the vent valve or the water discharge valve, since the only outlet openings are at the places where the actuating rods enter the hollow pedestal casings; and I can safely pack these actuating rods since there is no possibility of their "sticking" in action for the reason that they are connected directly to the arms of the manifold which must move when the tank tilts. Thus I am enabled to use free moving valves without any packing and I have thus overcome an objectionable condition in devices of this character previously made where the valves were packed and often stuck and failed to properly function.

I prefer to fit the tilting tank 39 with an automatic air vent valve 141 (Fig. 1) for the purpose of permitting the escape of air accumulations whenever the pressure within the tank, due to the presence of steam, increases and by reason of which the air within the tank is blown out. The general construction of this automatic air relief valve comprises the body part having the thorofare provided with an outwardly movable check valve 142, which is normally kept open by means of a spring 144 whose tension may be adjusted by means of an adjustable tubular bushing 145, but which under any rush of steam with its increased pressure will instantly close upon its seat 143 (against the pressure of the spring 144) and thus automatically check the escape of any appreciable amount of steam. In this manner, it is not possible for the tank to become air bound and in fact, with the presence of this automatic air relief valve 141, it is possible to operate satisfactorily without the necessity of the vent valve 116, where the water being handled is sufficiently cold to readily condense the steam within the tank during the act of filling. In the case of handling hot water of condensation, then the said automatic valve 141 is desirable in conjunction with the vent valve 116 in that the latter provides a free relief for steam and vapor and the valve 141 will operate to release the air which may be within the tank at a time when the vent valve 116 is closed.

An important feature of improvement resides in the fact that the two valves 91 and 116 are never both open at one time, so that there is no possibility of steam blowing through directly into the vent.

In the preferred form of my invention, I have illustrated the intermediate bearing with its axis in alinement with the axes of the two swing joints also forming bearings, and the intermediate bearing as a downwardly extending cylindrical part sustained by the adjustable roller bearings, but it is manifest that the rollers may be arranged upon either portion, if so desired; and further, the cylindrical portion of the intermediate bearing may be made as a recess as distinguished from a projecting portion, and the roller bearing supports extended into the recesses, the only requisite in either case being that the curved surface shall be of sufficient diameter to properly receive and cooperate with the roller bearings when arranged at opposite sides of a vertical plane through the axis of oscillation of the bearings.

While I have illustrated my improvements in conjunction with a simplex or single acting machine, that is, having only a single compartment, nevertheless, this is by way of example only, as the said improvements are equally applicable in general to duplex tilting traps or pumps and I, therefore, do not wish to be restricted in this respect.

I also point out that while the amount of friction which comes upon the swing joint bearings is dependent upon the adjustment of the main intermediate bearing, it is to be understood that this feature of my invention is directed to a relative adjustment between the main intermediate bearing and the swing joint bearings, hence, broadly considered, may be answered by an adjustment of either one of these classes of bearings relatively to the other, and in fact the adjustment may be applied to both; thus liners of usual character may be placed under the pedestal casings and where very fine adjustments are desired, the remaining adjustment may be by the adjustable roller bearings.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:

1. A device of the character stated including a trap tank, two rigidly supported pivotal bearings for said tank spaced apart and respectively provided with oppositely directed tubular bearing portions, and centrally arranged means rigid with the tank intermediate of said spaced bearings and receiving the oppositely directed tubular bearing portions thereof, and further bearing means immediately beneath the means rigid with the tank for so sustaining the weight of the tank and its contents that the friction due to the weight thereof is reduced at said pivotal bearings.

2. A device of the character stated, including a trap tank, rigidly supported pivotal bearings spaced apart for said tank, means rigid with the tank intermediate of the spaced bearings, and adjustable weight sustaining means intermediate of the pivotal bearings whereby the sustaining points of contact for the means rigid with the tank may be raised or lowered and the weight of the tank mainly sustained to reduce the strain upon the pivotal bearings.

3. A device of the character stated, including a long trap tank having secured centrally of its underside a manifold having transverse tubular openings arranged in alinement and a curved journal surface intermediate of them and upon which the weight of the tank is substantially balanced, combined with a base having upwardly extending valve chambers arranged respectively on opposite sides of the manifold and provided with horizontally directed stationary tubular bearings respectively fitting into the tubular openings of the manifold and constituting bearings therefor arranged at each side of the central portion of the tank upon which the tank and its manifold oscillate, stuffing boxes upon the manifold for making water tight swing joints with the tubular bearings, and separate adjustable means forming a bearing for the curved journal surface of the manifold and operative in a vertical direction to take up and sustain the greater portion of the weight of said tank and whereby the friction is reduced upon said stationary tubular bearings.

4. A device of the character stated including a trap tank, a pivotal bearing for said trap tank, said tank having means depending therefrom providing a lower curved surface, elevating means having rollers relatively spaced apart between which said curved surface of said depending means extends, and means for moving said rollers toward each other into engagement with said curved surface whereby said depending means is raised to take a portion of the weight of said tank off said bearing to reduce the friction at said bearing.

5. The invention according to claim 3, wherein further, the means forming the bearing for the curved journal surface on the underside of the manifold is adjustable vertically in respect to the base and the stationary tubular bearings to permit accurate adjustment in the alinement of the swing joints and to compensate for any wear.

6. A device of the character stated including a trap tank, transversely arranged and laterally extending tubular swing joints in alinement and supported in fixed bearings to provide pivotal bearings for the tank and also conduits for fluid flowing into and out of said tank, and bearing means under the tank for sustaining a portion of its weight whereby friction is reduced at said swing joint bearings, and wherein said bearing means for sustaining a portion of the weight of the tank is located between the swing joints and is adjustable for supporting the tank under varying degrees of vertical adjustment relative to the axial alinement of the swing joints, said means normally rigid as to position of adjustment and to the axis of oscillation of the tank.

7. A device of the character stated including a trap tank having a manifold secured at its bottom and provided with laterally extending tubular arms respectively communicating with passages opening into said tank at different levels, fluid conducting swing joints in communication with the tubular arms and in axial alinement, means to supply fluid to and from one of the swing joints, means to supply steam to the other swing joint, and means for engagement with said manifold between said swing joints and adjustable upwardly in cooperation with said manifold to sustain a portion of the weight of said tank and reduce the friction at said swing joints.

8. A device of the character stated including a trap tank, pivotal bearings for said tank spaced apart, a depending portion from said tank between said bearings providing a curved surface, roller bearing members, rollers supported by said bearing members and in engagement with said curved surface of said depending portion so that a part of said curved surface extends between said rollers, and means for adjusting said roller bearing members whereby said pivotal bearings will be maintained in axial alinement and the friction thereon reduced.

9. A device of the character stated including a trap tank having a manifold secured at its bottom, said manifold having passages leading into said tank, a plurality of rigidly positioned fluid conducting nipples spaced apart and providing bearings for said tank and communicating respectively with said passages, said manifold having a curved surface, rollers spaced apart in parallel relation and in engagement with said curved surface, and means for moving said rollers relatively to each other whereby pressure will be exerted upwardly on said manifold and the friction upon the bearings reduced.

10. A device of the character stated including a trap tank having a manifold secured at its bottom, said manifold having passages, fluid conducting nipples spaced apart and providing bearings for said tank and communicating respectively with said passages, said manifold having a curved surface, rollers spaced apart and in engagement with said curved surface, means for moving said rollers toward each other whereby pressure will be exerted upwardly on said manifold, said tank having a forwardly extending passage communicating with one of said passages of the manifold, and an upright pipe in said tank open at its top and at its bottom communicating with another of said passages in the manifold.

11. A device of the character stated including a trap tank mounted to tilt, a stationary chamber, a fluid controlling valve therein, said chamber having an opening to the atmosphere, a rod movably mounted in said opening connected outside of the chamber with the tank and operative under the tilting action of said tank, packing surrounding said movably mounted rod and forming a seal for said opening, and lever means arranged within said chamber actuated by the rod and adapted to actuate said valve, said lever means supported independently of the tank and said valve operating synchronously with the oscillations of the tilting tank.

12. A device of the character stated including a trap tank mounted so as to tilt, a stationary casing including a water inlet chamber for receiving pressure fluid in communication with the interior of said tank, an outlet chamber separated from the inlet chamber by a partition having a valve port therein, a valve for controlling said port, said stationary casing having another chamber into which the stem of said valve extends and also having an opening in its outer wall, an actuating rod extending through said opening and adapted to be reciprocated by the tilting action of said tank, packing surrounding said actuating rod and forming a seal for said opening; and a lever adapted to be moved by said actuating rod to cause the operation of said valve.

13. The invention according to claim 12, further having the lever provided with an adjustable pin thereon for operative engagement with said valve, whereby the extent and time of action with respect to the valve may be adjusted.

14. A device of the character stated including a trap tank mounted so as to tilt, a stationary casing including an outlet chamber and an inlet chamber for receiving pressure fluid having a communication with the interior of the tank through the medium of an oscillatory bearing, said stationary casing also provided with a third chamber and the inlet chamber separated from the outlet chamber and the third chamber by means of a partition having a valve port therein, a valve for controlling said port, an actuating rod connected with the tilting tank and extending into the interior of the third chamber through a packed joint therein, and mechanical means arranged within the third chamber, whereby the valve is operated by the actuating rod.

15. The invention according to claim 14, further provided with a second stationary casing having a steam inlet chamber and a vent chamber respectively in communication with a common intermediate chamber opening into the interior of the tank by a second oscillatory bearing, valves for respectively controlling the communication between the steam and vent chamber and the common intermediate chamber, and means for operating the valves including reciprocating rods actuated by the tilting tank and extending into the said second stationary casing through packed joints, whereby said reciprocating rods may be positively operated by the tank while tightly packed, and the valves themselves may be freely movable.

16. A device of the character stated including a trap tank mounted to tilt, a stationary casing having fluid passage therein for supply and discharge of fluid with respect to the tank, a fluid controlling valve for controlling the fluid passage, an actuating rod movably mounted to extend through an opening in the casing and operative due to the tilting action of said tank, and a lever movably mounted in the casing and adapted to be moved by said actuating rod when the trap tank tilts in one direction for opening the valve, said actuating rod being movable out of operating engagement with said lever when the tank tilts in an opposite direction.

17. In a device of the character stated, a tilting tank combined with automatic valve devices controlled by the tilting of the tank for delivering water into the tank to fill and tilt it, automatic valve devices also controlled by the tilting of the tank for permitting the admission of steam thereinto and discharging the water therefrom, said valve devices operating alternately, and air relief means connected with the upper portion of the tank and comprising a valve body having a thorofare opening from the tank to the atmosphere, an outwardly seating check valve adapted to tightly close the thorofare under a predetermined initial pressure within the tank, and spring devices to normally hold the check valve in open position until a predetermined tank pressure is obtained.

18. The invention according to claim 17, further having adjustable means for varying the tension of the spring whereby the extent of operative pressure within the tank to close the check valve may be predetermined.

19. A device of the character stated including a pivotally mounted trap tank; and a counter-balance weight for one end of said tank, said tank and weight having a slot and rib connection whereby the weight is slidably interlocked with the tank.

20. A device of the character stated, including a pivotally mounted trap tank, and a counter-balance weight for one end of said tank, said tank and weight having a slot and rib connection and also shoulder portions for abutment with each other to limit the sliding action of the weight relative to the tank.

21. A device of the character stated, including a trap tank, two rigidly supported pivotal bearings spaced apart for said tank, and means intermediate of said spaced bearings for so sustaining the weight of the tank and its contents that the friction, due to the weight thereof, is reduced at said pivotal bearings, said intermediately arranged weight sustaining bearing means normally providing rigidly positioned points of support but manually adjustable as to its supporting bearing surfaces whereby they coact with the bearing surfaces on the tank to enable the sustaining points of contact to be raised or lowered to provide a vertical adjustment to remove more or less strain on the pivotal bearings.

22. In a device of the character stated, a tilting tank combined with valve devices controlled by the tilting of the tank for delivering water into the tank to fill it, and automatic valve devices also controlled by the tilting of the tank for permitting the admission of steam thereinto and discharging the water therefrom, said valve devices operating alternately, distinguished by separate rigidly positioned water and steam chambers respectively in communication with sources of water and steam supply, the steam valve in one of said chambers controlling the supply of steam to the tank and the water valve in the other of said chambers controlling the discharge of water from the tank, separate plungers for each of the chambers reciprocable through stuffing boxes on said chambers for respectively operating the valves therein and mechanical connections between the plungers and the tilting tank, whereby said plungers are caused to alternately operate their respective valves.

In testimony of which invention, I hereunto set my hand.

HOWARD G. SHORTT.